United States Patent Office 3,421,877
Patented Jan. 14, 1969

3,421,877
METHOD OF PRECIPITATING POTASH FROM A PHOSPHATE MIXTURE
Maria G. Dunseth, Phoenix, and Murrell L. Salutsky, Silver Spring, Md., assignors, by direct and mesne assignments, of one-half each to W. R. Grace & Co., New York, N.Y., and the United States of America as represented by the Secretary of the Interior
No Drawing. Filed Apr. 19, 1965, Ser. No. 449,341
U.S. Cl. 71—36        2 Claims
Int. Cl. C05b 7/00

ABSTRACT OF THE DISCLOSURE

A mixture of magnesium potassium phosphate, sodium phosphate and calcium phosphate is contacted with potassium chloride solution to effect the formation of a phosphate precipitate rich in potassium.

---

The invention herein described and claimed may be manufactured and used by or for the Government of the United States of America for governmental purposes without the payment of royalties thereon or therefor.

This invention relates to production of high analysis potassium phosphate fertilizers from brines such as sea water, and resulted from work done under Contract 14-01-0001-281 with the Office of Saline Water of the Department of the Interior, entered into pursuant to the Saline Water Act, 42 U.S.C. 1951-1958g.

Numerous salt water brines, such as sea water, contain substantial amounts of various valuable elements such as potassium, calcium, magnesium, etc. As the available supply of these chemicals from other sources dwindles or becomes more expensive, interest in the use of brines as raw material sources has increased. Potash, in particular, is widely used in the chemical industry for production of many chemicals, particularly fertilizers. Recovery and utilization of potassium from sea water would represent a valuable additional source of this chemical.

Treatment of brines to remove magnesium and calcium and precipitate potassium as essentially magnesium potassium phosphate is disclosed in the copending U.S. application of Dunseth and Salutsky, Ser. No. 152,168, filed November 14, 1961. The precipitate thus obtained is a mixture consisting essentially of $MgKPO_4$ and varying amounts of calcium and sodium phosphates. Proportions of calcium in the precipitate will usually vary from about 5% to 10% while that of sodium is usually from about 5% to 7%.

It has now been found that a phosphate precipitate, such as the $KMgPO_4$-containing precipitate obtained by the process of Ser. No. 152,168, may be treated with an aqueous solution of potassium chloride to produce a high analysis (high $K_2O$), water insoluble, metal potassium phosphate composition, which is of particular value as a fertilizer due to its high potassium content.

Optimum amount and concentration of potassium chloride solution will vary with digestion time and temperature as well as with the amount of phosphate precipitate and are best determined experimentally. Digestion time is not critical and may vary from about 1 to 5 hours. Preferred temperature is 25° C.

The process of the invention is more specifically illustrated by the following example.

Example

Magnesium potassium phosphate-containing precipitates, obtained by precipitation from sea water according to the procedure of application Ser. No. 152,168, were digested with 1.3, 5 and 10 percent potassium chloride solutions. The procedure used was as follows: Into a flask was introduced a predetermined weight of the phosphate precipitate containing 3.84% $K_2O$. Then a weighed amount of KCl solution was introduced and the resulting slurry containing 1, 5 or 10 percent solids was digested for 5 hours at room temperature and then filtered. The filter cake was washed and dried at 80° C. Results are given in the following table.

EFFECT OF DIGESTION WITH KCl SOLUTION ON COMPOSITION OF PHOSPHATES PRECIPITATED FROM SEA WATER

| | KCl in Solution | | | | | | | | |
|---|---|---|---|---|---|---|---|---|---|
| | 10% | | | 5% | | | 1.3% | | |
| Percent solids in slurry of KCl solution and phosphate precipitate | 10 | 5 | 1 | 10 | 5 | 1 | 10 | 5 | 1 |
| Grams $K_2O$ in KCl solution | 14.2 | 29.9 | 62.4 | 28.3 | 29.2 | 31.0 | 7.3 | 7.7 | 8.1 |
| Weight of original sample, grams | 25 | 25 | 10 | 100 | 50 | 10 | 100 | 50 | 10 |
| Percent $K_2O$ in treated sample [1] (filter cake) | 12.14 | 17.56 | 19.98 | 11.00 | 11.90 | 18.24 | 6.80 | 8.64 | 12.48 |

[1] Original sample contained 3.84% $K_2O$.

It can be seen from the data in the table that the potassium content of the phosphate precipitates increases in all cases after treatment with the potassium chloride solution. The 3.84% $K_2O$ content of the untreated phosphates was increased to as much as 20% by treatment with 10% potassium chloride solution. The greater the percentage of KCl in solution the higher the percent $K_2O$ in the product, e.g., the products after treatment with 1.3% KCl solution contained about 6–12% $K_2O$ while those from treatment with 10% KCl solution contained about 12–20% $K_2O$. The dilute slurries (e.g., those containing 1% solids) yielded products containing a higher percent $K_2O$ than the more concentrated solutions.

What is claimed is:
1. A method for producing a water insoluble metal phosphate composition having a high $K_2O$ analysis comprising
    (a) contacting a feed mixture of solid magnesium potassium phosphate, sodium phosphate and calcium phosphate with an about 1 to about 10 percent potassium chloride solution for a period of about 1 to about 5 hours to effect formation of a metal phosphate precipitate composition having a potassium content substantially higher than the potassium content of said feed mixture; and (b) separating said composition from solution.

2. The method of claim 1 in which the calcium content of said feed mixture is from about 5% to about 10%; and in which the sodium content of said feed mixture is from about 5% to about 7%.

References Cited

UNITED STATES PATENTS

| 1,144,405 | 6/1915 | Willson | 71—51 |
| 1,591,272 | 7/1926 | Blumenberg | 71—36 |

DONALL H. SYLVESTER, *Primary Examiner.*

E. R. FREEDMAN, *Assistant Examiner.*

U.S. Cl. X.R.

71—51